(12) United States Patent
Hofele et al.

(10) Patent No.: US 6,223,582 B1
(45) Date of Patent: May 1, 2001

(54) TRANSFER SYSTEM HAVING A COMBINED DRIVE

(75) Inventors: Hans Hofele, Göppingen; Andreas Dangelmayr, Ottenbach; Jürgen Eltze, Göppingen; Karl Thudium, Wäschenbeuren, all of (DE)

(73) Assignee: Schuler Pressen GmbH & Co., Goeppingen (DE)

( * ) Notice: Subject to any disclaimer, the term of this patent is extended or adjusted under 35 U.S.C. 154(b) by 0 days.

(21) Appl. No.: 09/437,257

(22) Filed: Nov. 10, 1999

(30) Foreign Application Priority Data

Nov. 10, 1998 (DE) .............................................. 198 51 745

(51) Int. Cl.⁷ .................................................. B21D 43/05
(52) U.S. Cl. ................. 72/405.09; 72/405.1; 72/405.01; 198/621.1
(58) Field of Search ............................ 72/405.16, 405.1, 72/405.11, 405.09, 405.01; 198/621.1; 414/751.1, 752.1

(56) References Cited

U.S. PATENT DOCUMENTS

| 4,024,959 | * | 5/1977 | Gruner ............................ 414/751.1 |
| 4,487,409 | * | 12/1984 | Orii .................................. 414/752.1 |
| 4,585,389 | * | 4/1986 | Watanabe ........................ 414/751.1 |
| 5,140,839 | | 8/1992 | Bruns . |
| 5,267,463 | * | 12/1993 | Doyama .......................... 72/405.16 |
| 5,899,108 | * | 5/1999 | Hofele ............................. 72/405.11 |
| 5,970,763 | * | 10/1999 | Takayama ....................... 72/405.16 |

\* cited by examiner

*Primary Examiner*—Daniel C. Crane
(74) *Attorney, Agent, or Firm*—Evenson, McKeown, Edwards & Lenahan, P.L.L.C.

(57) ABSTRACT

A transfer system, particularly for the transfer of workpieces in multi-station presses, includes several transfer modules, each of which has a workpiece holding device carried by at least one lever mechanism. Each lever mechanism transmits the adjusting movement of two mutually independent drives to the workpiece holding device. One of the drives is disposed in a stationary manner and the other drive is moved by the stationarily disposed drive.

16 Claims, 6 Drawing Sheets

TRANSFER SYSTEM HAVING A COMBINED DRIVE

BACKGROUND OF THE INVENTION

This application claims priority of DE 198 51 745.9, filed Nov. 10, 1998, the disclosure of which is expressly incorporated by reference herein.

The present invention relates to a transfer system, particularly for the transfer of workpieces between successive machining stations, such as press stages of large-piece transfer presses.

As a rule, a transfer system, which extends along the entire length of the press and moves the individual workpieces in synchronism, carries out the piece transport from one press stage to another. Such a known transfer system is described, for example, in DE 41 43 099 A1. This transfer system has two transfer rails which extend along the length of the press and on which carriages are disposed. Two carriages respectively carry a cross traverse between one another which is provided with suction spiders for receiving workpieces. For carrying out the transfer step from one press stage to another, the carriages are connected by a linkage with a cam drive which is connected with the main drive of the press. A lifting and lowering movement is superimposed on the back-and-forth movement of the transfer rails achieved in this manner. This lifting and lowering movement is achieved in that the rails are lifted and lowered as a whole.

Such a transfer system synchronously moves the suction traverses connected with a cam drive. Correspondingly, the participating tools must open and close simultaneously.

In contrast, WO 93/00185, discloses a transfer system which has transfer modules between individual press stages. The transfer modules can be controlled independently of one another. Each transfer module has two driving units which are applied on the right and the left to a respective suction traverse. The driving units contain a lifting unit, which is stationarily disposed, and an advancing unit, which is lifted and lowered by the lifting unit. The advancing unit contains a motor which drives the suction bridge by way of a planetary gear combined with a double crank. In this case, the backlash of the planetary gear is added to a possible bearing play between the individual interlinked cranks which finally adds up to an unreliable positioning existing at the suction bridge.

SUMMARY OF THE INVENTION

An object of the present invention is to provide a modular workpiece transfer system which permits a high positioning speed and a good positioning precision.

This object has been achieved by a transfer system which has a transfer system for the transport and the positioning of workpieces, comprising a controllable workpiece holding device configured to be set up for temporarily coupling a workpiece to a carrier device, a lever mechanism configuration to hold with an output and guide the workpiece holding device with its output and guides it on an at least two-dimensional transfer curve, and at least two drive units which are connected by way of the lever mechanism with the workpiece holding device and of which one of the drive units is arranged in a stationary manner and the other of the drive units is arranged in a movable manner as an intermediate member in the lever mechanism.

The transfer system according to the invention uses a lever mechanism for guiding and positioning a workpiece holding device. This lever mechanism determines the actual position and the movement of the workpiece holding device by the interaction of at least two levers. One of the levers is connected at its one end with the other lever which, in addition, is guided at a point spaced away from the connection point. This double guidance or support results in a relatively high positioning precision and the influence of bearing plays or hinge clearances is largely repressed.

It has been found to be advantageous for the dynamics (transport speed) as well as for the positioning precision to provide two preferably separately controllable drive units, of which one is stationarily disposed and the other is integrated in the lever mechanism or is directly connected with it. The stationary drive can be configured to be stable and high-powered without its weight impairing the dynamics of the transfer system. As a result of the solid construction of the concerned stationary drive unit, however precision advantages can be achieved.

The integration of the moved drive into the lever mechanism or the connection to the latter preferably takes place at a point of the lever mechanism which carries out only slow movements. Therefore, the transposition of the driving movement to the desired transfer curve is carried out by the lever mechanism. As the result of the integration of the moved drive in the lever mechanism or the direct connection to the latter, the transposition of the driving movement can be achieved with little play which, in turn, results in a good positioning precision.

The lever mechanism preferably has a swivel arm which is connected with the carrier device at one end, is connected, at a connection point spaced away therefrom, with a driving device and is connected at another point with a guiding device. The lever arm or swivel arm is therefore supported twice, which results in a precise guidance.

Preferably, one connection point is used for the positioning of the swivel arm, with the lever position being defined in at least two directions and one degree of freedom (swivelling axis). The other connection point is preferably constructed as a guide with two degrees of freedom. This means that the lever in this case is disposed to be displaceable and swivellable, for example, in one direction.

Although, in principle, other configurations are within the scope of the present invention, it is found to be advantageous in many embodiments for the inoperative drive unit to be a linear drive and, for the moved-along drive unit to be a swivel drive. The linear unit may operate, for example, by way of a ball screw spindle with a high gear reduction and cause only a lifting or lowering of the workpiece holding device. The swivel drive may, for example, be connected with a swivellably disposed guide rod which, in turn, is connected with the swivel arm. The connection may be formed by an articulation.

As required, the swivel drive may also be arranged in a stationarily inoperative manner and may impart the desired swivelling movement to the guide rod connected with the swivel arm or to the swivel arm itself. A vertical adjustment of the workpiece holding device will then be caused by a length adjustment of the swivel arm by a telescopic drive which is moved along.

The lever mechanism is preferably completely arranged in a plane which is aligned parallel to the plane defined by the transfer curve, that is, in most cases, vertically. This has the significant advantage that, when the transfer stroke is carried out, the individual elements of the lever mechanism do not pass through laterally projecting movements. In the inoperative or intermediate position during the work of the individual press stages, the elements of the lever mechanism can remain in a very space-saving manner between the press stages in the parking position.

During the operation of the transfer system, that is, when a transport stroke is carried out, the swivel arm or the lever mechanism guides the workpiece holding device, for example, the suction bridge also in a space-saving manner. Thus, while the press erection surface is minimal, maximal space is available for the individual press stages. Finally, this is achieved in that all articulation axes and swivel axes of the lever mechanism extend transversely to the transport direction and horizontally or at least at a right angle with respect to the plane described by the transfer curve.

BRIEF DESCRIPTION OF THE DRAWINGS

Other objects, advantages and novel features of the present invention will become apparent from the following detailed description of the invention when considered in conjunction with the accompanying drawings.

FIG. 2 is a schematic perspective view of two press stations with a transfer modules arranged in-between;

DETAILED DESCRIPTION OF THE DRAWINGS

Figure 1:
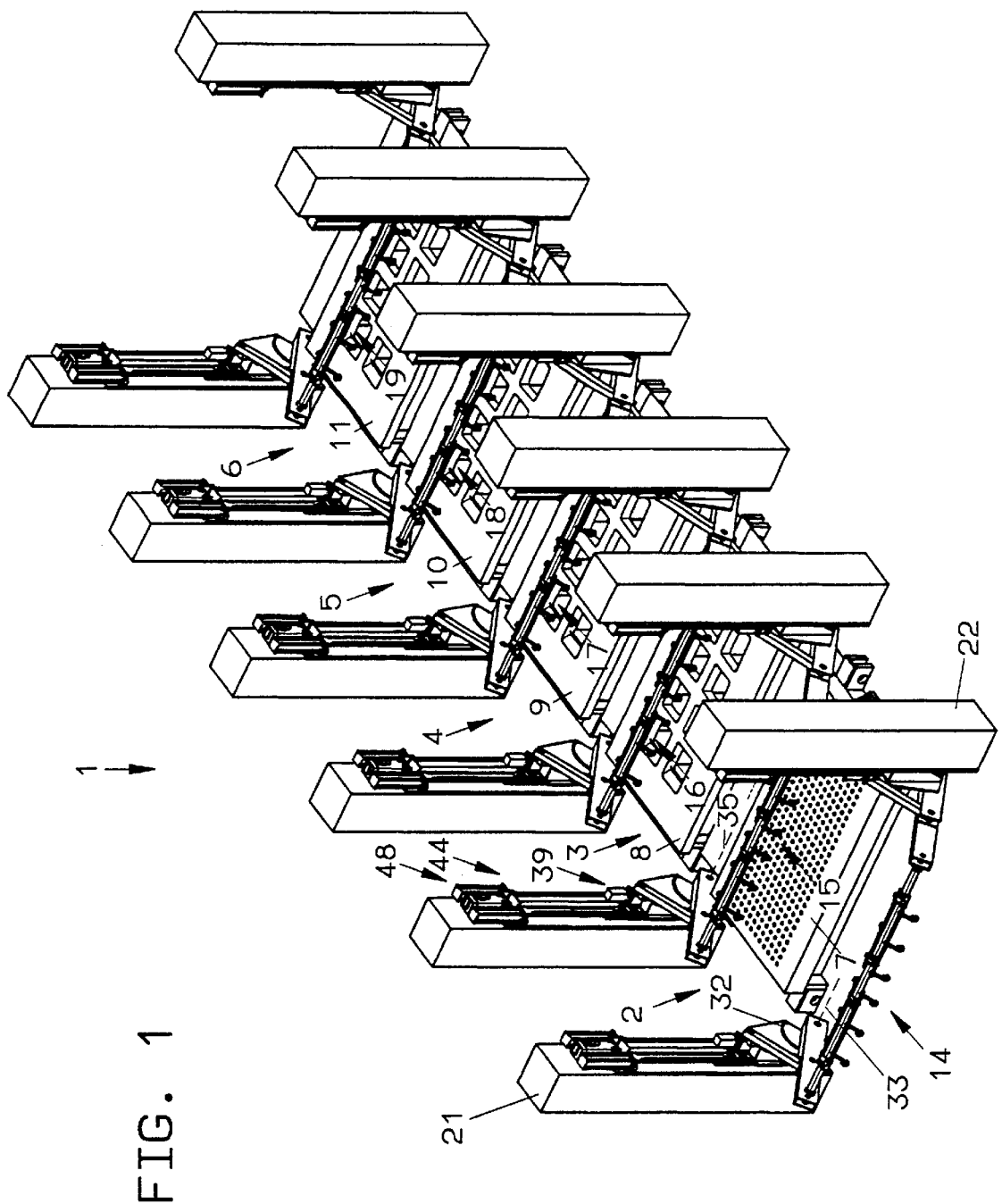
FIG. 1 is a schematic perspective isolated view of a press working line with a modular transfer system and several successive press stations.

FIG. 1 illustrates a transfer press 1 having several successive press stations 2, 3, 4, 5, 6. The press stations 2 to 6 include press sliding tables 7, 8, 9, 10, 11, on which known tools are arranged. In order to permit the parts transport into the press stations 2 to 6 and out of the latter as well the transfer of workpieces from one press station to the next, transfer modules 14, 15, 16, 17, 18, 19 are in each case arranged in front of and behind each press station 2 to 6. These transfer modules 14, 15, 16, 17 18, 19 are set up for receiving, transporting and depositing workpieces, such as vehicle body parts of motor vehicles. In this embodiment, the transfer modules 14 to 19 can be controlled independently of one another so that they need not necessarily operate in synchronism. This opens up the possibility of maximizing the stroke rate of the press and optimizing the transfer movement for each press station. In addition, individual press stations 2 to 6 can work in an offset manner.

Figure 2:
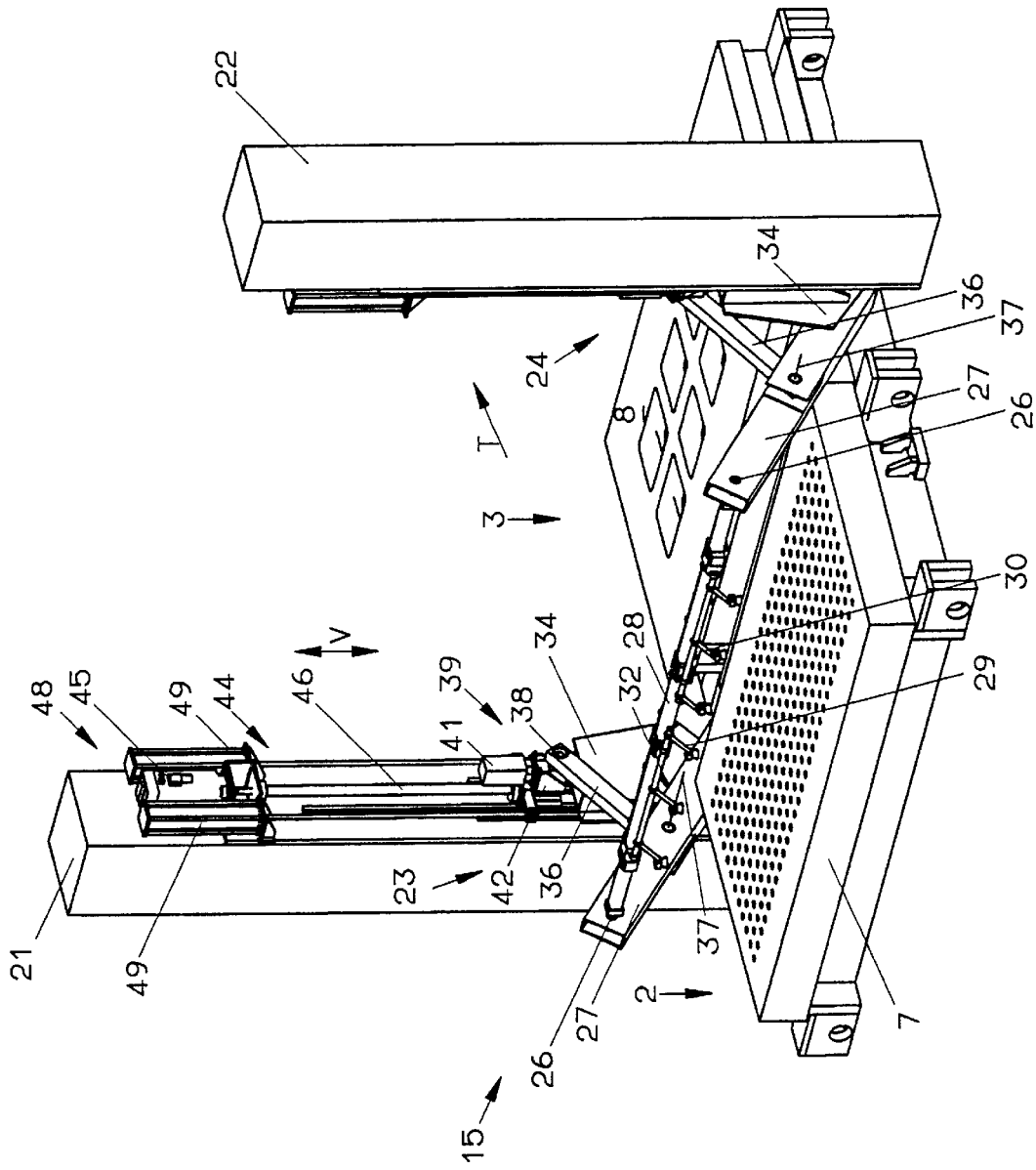

The transfer modules 14 to 19 have identical constructions. In a manner representative of all other transfer modules 14, 16, 17, 18, 19, in the following, transfer module 15 will be described in greater detail by reference to FIG. 2. The transfer module 15 is arranged on two press stands 21, 22 which are disposed between the press stations 2, 3. As required, however, the transfer module may also be fastened or disposed in a different manner. The transfer module 15 includes two lever mechanisms 23, 24 which are assigned to the press stands 21 and 22.

The lever mechanisms 23, 24 and their corresponding drives are constructed symmetrically with respect to an imaginary vertical plane along the transport direction T. The following description of the lever mechanism 23 therefore applies in a corresponding manner to the lever mechanism 24. The two lever mechanisms 23, 24 each have an output 26 which is formed by a corresponding receiving device at one end of a swivel arm 27. One end of a suction bridge 28 respectively is disposed in the receiving device in an optionally swivellable manner. The suction bridge 28 extends transversely to the transport direction T. The suction bridge 28 is used as a workpiece holding device and is formed essentially by a special section tube which carries one or several section spider(s) 29, 30. These each have several suction cups projecting on short arms away from the suction bridge 28.

The swivel arm 27 of the lever mechanism 23 is swivellably disposed in a curved guide 32 at its end situated away from the receiving device 26. As illustrated particularly in FIG. 1, the curved guide 32 defines a horizontal swivelling axis 33 which is oriented transversely to the transport direction T.

The curved guide 32 is disposed on a guiding slide block 34 which is disposed in a vertically displaceable manner by way of a linear guide held on the press stands 21, 22. In this case, the guiding slide block 34 is freely displaceable in the vertical direction V.

In addition to having the swivel arm 27, the lever mechanism 23 includes a guide rod 36 which, on one end, is swivellably disposed on the swivel arm 27 on an articulation defining a swivelling axis 37. The swivelling axis 37 is oriented parallel to the swivelling axis 33. By virtue of its end away from the swivel arm 27, the guide rod 36 is connected with the output shaft 38 of a swivel unit 39. This swivel unit defines the swivelling position of the guide rod 36. The swivel unit 39 includes a servo motor 41 which acts upon the output shaft 38, for example, by way of a step-down and angular gear.

The swivel unit 39 is disposed on a linear slide block 42 which can be adjusted in the vertical direction V. The displacement direction of the linear slide block 34 coincides with that of the linear slide block 34. The linear slide block 42 is connected with a stroke drive 44, which includes a servo motor 45. The servo motor 45 is connected, for by a spindle stroke mechanism or a belt drive 46 with the linear slide block 42 in order to adjust its vertical position. The spindle stroke mechanism or the belt drive 46 transposes the rotating movement of the servo motor 45 into a stroke movement.

For compensating and for relieving the drive units, that is, the swivel unit 39 and the stroke unit 44, with respect to the weight of the lever mechanism 23, of the suction bridge 28 and of possible workpieces, a weight compensation device 48 is arranged on the press stand 21 and includes one or several pneumatic cylinders 49. These pneumatic cylinders 49 act upon the linear slide block 42 by way of an upwardly directed force.

Figure 3:
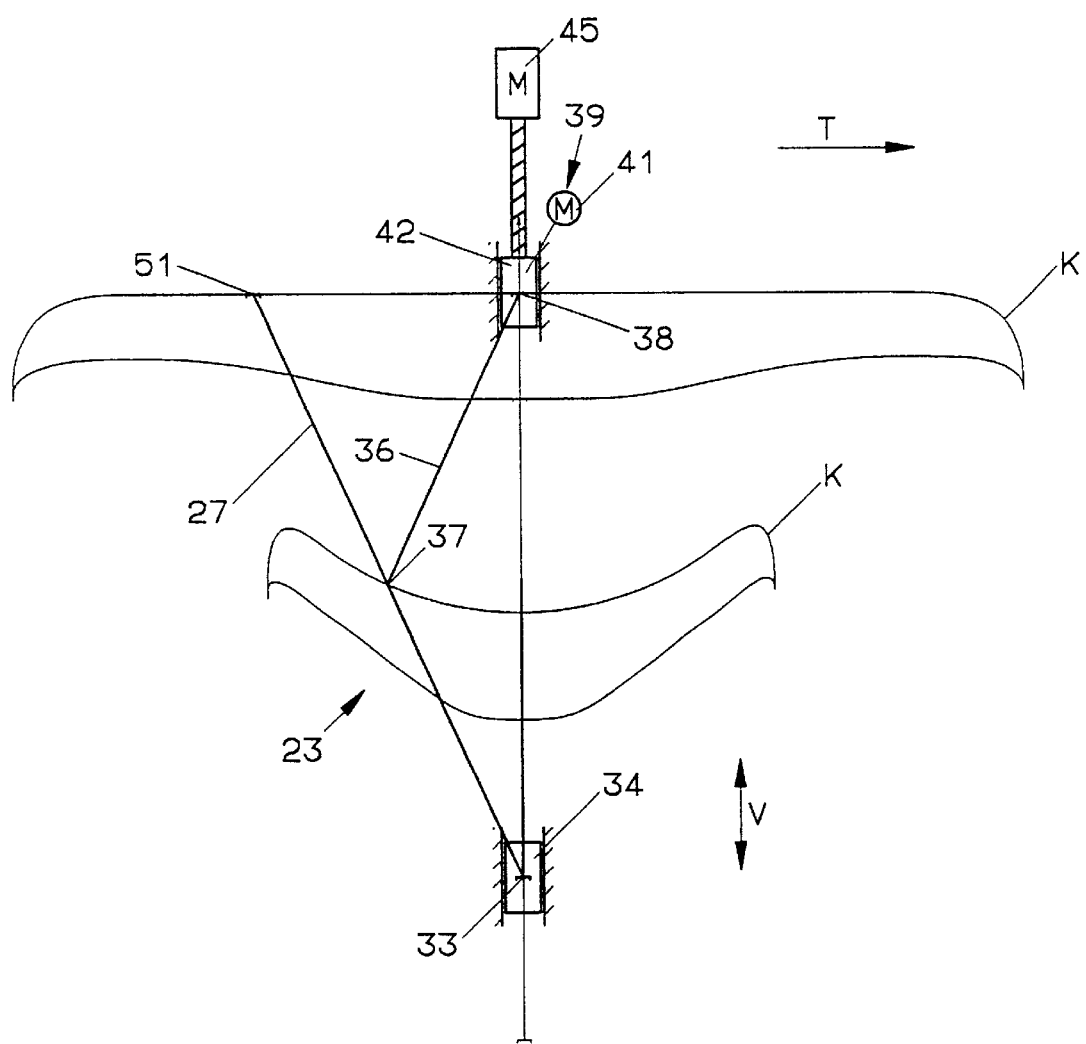
FIG. 3 is a basic diagram of the kinematics of the transfer module according to FIG. 2.

The kinematics of the lever mechanism 23 are illustrated particularly in FIG. 3. The length of the swivel arm 27 disposed on the linear slide block 34, as measured between the swivelling axis 33 and a center axis 51 of the suction bridge 28 about which the latter may optionally be swivellable, is twice as large as the length of the guide rod 36. This length is defined by the distance of the articulation axis 37 from the axis of rotation of the output shaft 38. The axis of articulation 37 is arranged precisely in the center of the swivel arm 27.

The transfer unit 15 described so far operates as follows. It is assumed that the suction bridge 28, which is indicated by its swivelling axis 51 in FIG. 3, and the swivel arm 27 are in the illustrated position.

For travelling through a transfer curve K, the suction bridge 28 must now be guided into the transfer direction T without any vertical adjustment. For this purpose, the swivel unit 39 is controlled such that the guide rod 36 in FIG. 3 moves counterclockwise. Without any triggering of the stroke unit 44, the suction bridge 28 travels along a straight path, with the linear slide block 34 carrying out a compensation movement in the vertical direction V. For depositing a workpiece in the tool of a subsequent press station, the transfer curve K is curved downward.

While the swivel unit 39 is braked, this path curve is travelled in that the stroke unit 44 is controlled simultaneously in order to move the linear slide block 42 in the downward direction. The movement in the transfer direction T is therefore controlled only by the swivel unit 39, and the movement in the vertical direction V is controlled only by the stroke unit 38. Correspondingly, the other sections of the transfer curve K are travelled by the appropriate controlling of the servo motors 41, 45. This is carried out by a control device which is not shown in detail and is preferably computer-operated.

The stroke movement of the stroke unit 44 is transmitted 1:1 to the suction bridge 28. However, the movement in the transfer direction T is stepped up. This takes place by the direct transfer of the swivelling movement from the guide rod 36 to the swivel arm 27 without the aid of intermediate gears, gear wheels or the like and by the relatively large distance between the articulation axis 37 and the swivelling axis 33 with high precision. In order to achieve a fast transport movement of the suction bridge 28, the swivel arm 36 must be swivelled only relatively slowly. Thus, the lifting and lowering speeds of the slide block 42 occurring at the swivel unit 39 as well as the adjusting movement generated by the swivel unit 39 are relatively slow. The existing masses hardly exhibit any inertia forces. The individual elements can therefore be designed in a relatively stable manner without any concessions to light construction measures. The movement of the swivel unit 39 with the linear slide blocks 42 does not impair the achievable accelerating and braking values.

Figure 4:
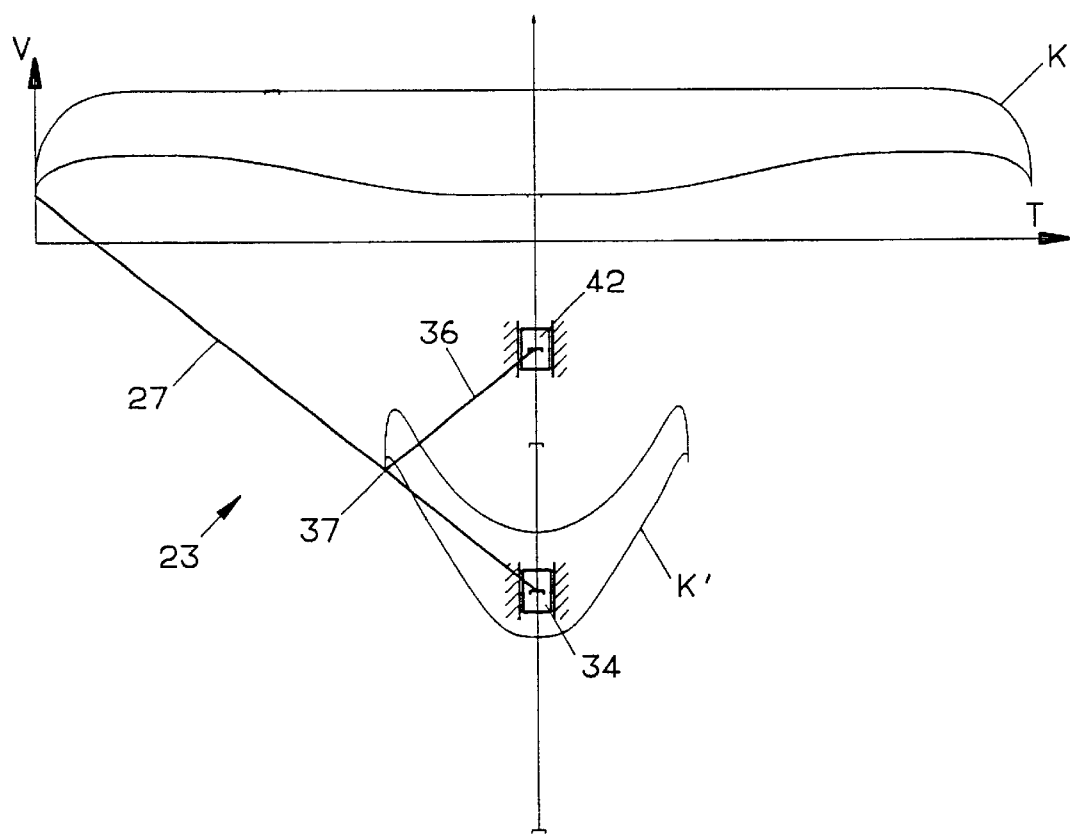
FIG. 4 is a view of the modified kinematics of a transfer module.

In the transfer module 15 with the kinematics shown in FIG. 3, a complete uncoupling has been achieved between the transfer movement, which is assigned only to the swivel unit 39, and the stroke movement, which is assigned only to the stroke unit 44. FIG. 4 illustrates a driving device with deviating kinematics which differ from those of FIG. 3 essentially because of the length ratios of the swivel arm 27 and the guide rod 36. As a result of the asymmetrical division of the swivel arm 27, as illustrated by the comparison of the transfer curve K with the curve K' travelled by the swivelling axis 27, a comparatively and advantageous greater step-up is achieved. In addition, the drive, as a whole, has a more compact construction or, while the size of the guide rods 36 and of the assigned drives is the same, longer transfer curves K can be achieved. In addition, the swivel unit 39 can be arranged at different points of the lever mechanism 23. As required, it can be arranged, for example, at the connection point between the guide rod 36 and the swivel arm 37. Alternatively, an arrangement on the linear slide block 34 is conceivable.

Figure 5:
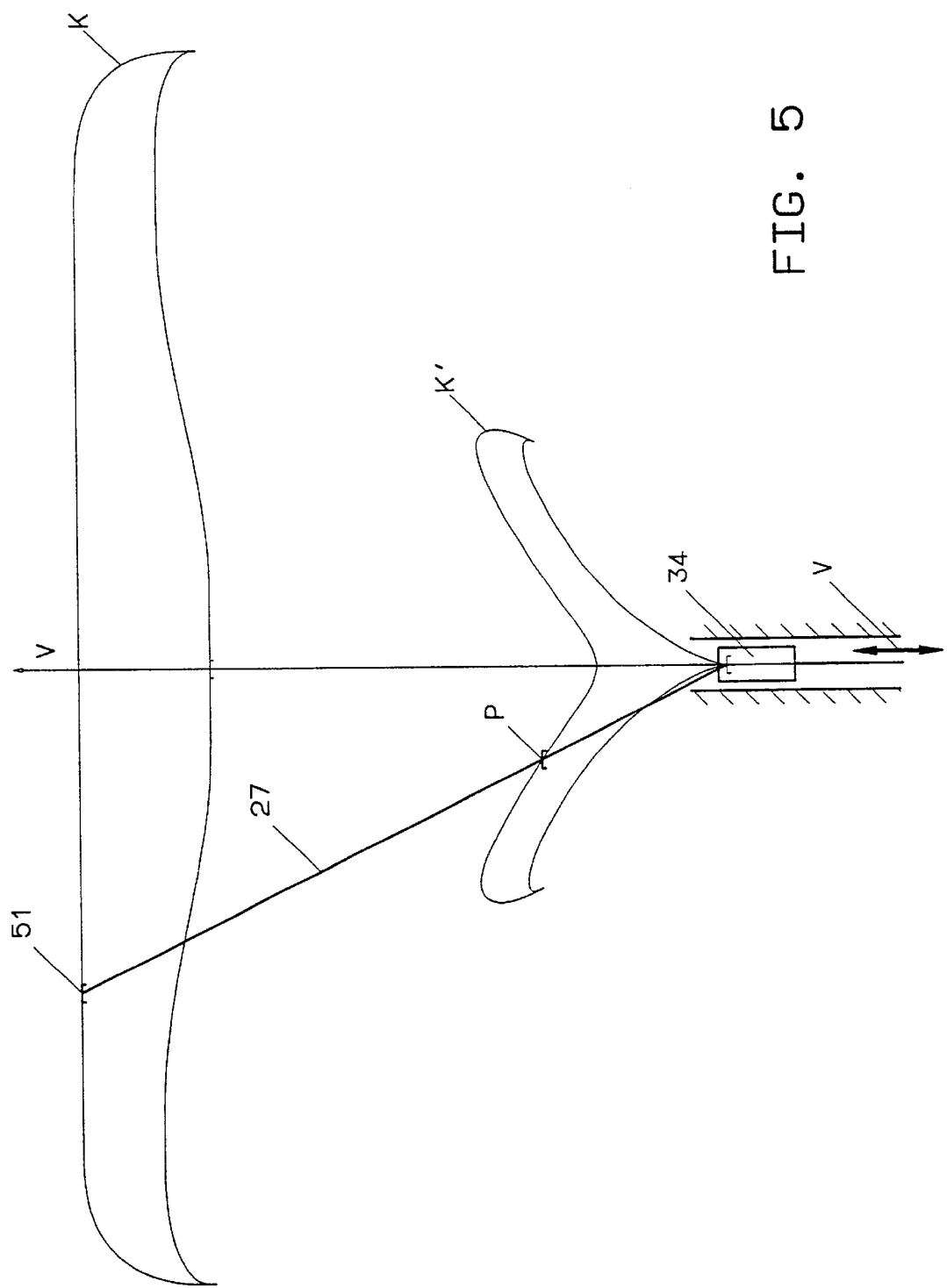
FIGS. 5 to 7 are views of transfer modules illustrated by way of their respective kinematics.

Based on the foregoing, the guide bar 36 can be eliminated if the linear slide block 34 carrying the linear drive is itself connected with a linear drive device which causes the adjustment of the linear slide block 34 in the vertical direction V. The swivel arm 27 again takes over the step-up, as illustrated by the comparison between the curve K', as seen in Figure which is travelled by an arbitrary point P of the swivel arm 17, and the transfer curve K as seen in FIG. 5.

Figure 6:
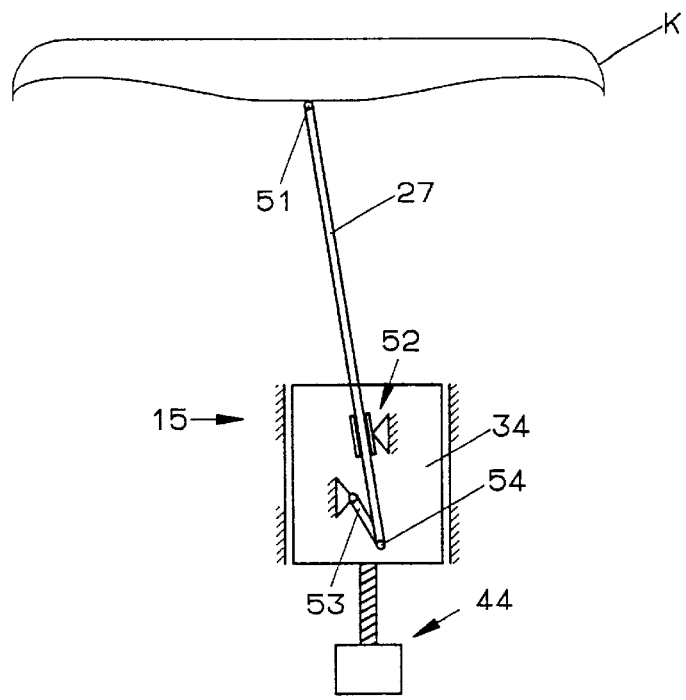
Figure 7:
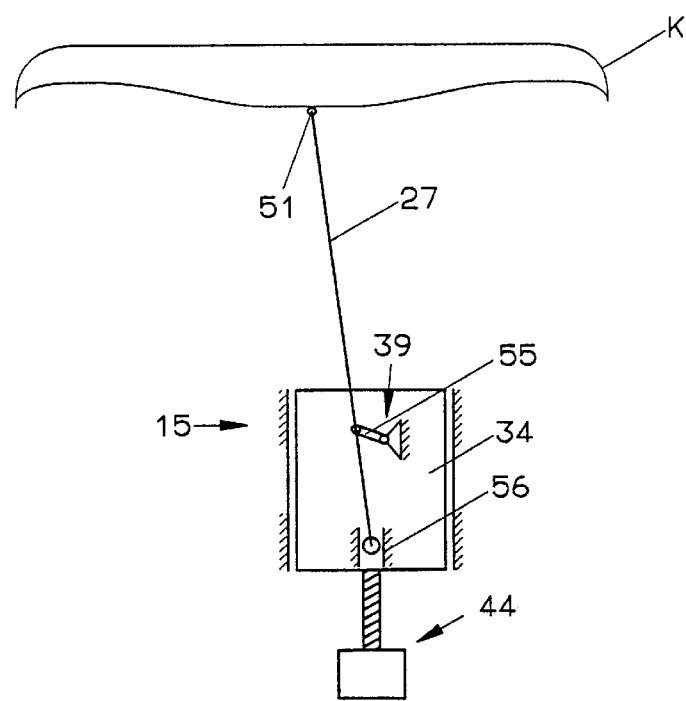

Additional embodiments are illustrated in FIG. 6 and 7. In the embodiment of FIG. 6, the linear slide block 34 is connected with the stroke unit 44. In addition, the slide block 34 carries a swivellably disposed linear guide 52. Its guiding direction is oriented parallel to the longitudinal direction of the swivel arm 27 to support this swivel arm 27. The guiding device 52 itself is disposed about a swivelling axis which is perpendicularly disposed on a plane described by the transfer curve K.

On its end away from the swivelling axis 51, the swivel arm 27 is connected with a driving device. This driving device may have a guide rod 53 which is swivellably connected at an articulation axis 54 with the end of the swivel arm 27. The other end of the guide rod 53 is connected with a rotary drive unit which is not illustrated in detail.

FIG. 7 illustrates a further modified embodiment of the transfer module 15 with an inoperative stroke unit 44 and with the slide block 34 with the moved swivel unit 39. The lower end of the swivel arm 27 is vertically displaceably disposed in a linear guide 56, while, at a point spaced away therefrom, the swivel arm 27 is connected with a guide rod 55. This guide rod 55 connects the swivel drive 39 with the swivel arm 27.

In summary, a transfer system, particularly for the transfer of workpieces in multi-station presses 1, has several transfer modules 14 to 19, which each have a workpiece holding device 28 carried by at least one lever mechanism 23. Each lever mechanism transmits the adjusting movement of two mutually independent drives 39, 44 to the workpiece holding device 28. One of the drives 39, 44 is disposed in a stationary manner and the other drive is moved by the stationarily disposed drive. This basic principle opens up many design possibilities.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transfer system for transport and positioning of workpieces, comprising
    a controllable workpiece holding device configured to be set up for temporarily coupling a workpiece to a carrier device,
    a lever mechanism whose components move in the same plane, and being configured to hold and guide the workpiece holding device on an at least two-dimensional transfer curve, and
    at least two drive units which are connected by the lever mechanism with the workpiece holding device, wherein one of the drive units is arranged in a stationary manner and another of the drive units is arranged in a movable manner as an intermediate member in the lever mechanism.

2. The transfer system according to claim 1, wherein another of the drive units is operatively connected with the swivel arm.

3. The transfer system according to claim 2, wherein another of the drive units operatively connected with the swivel arm comprises a linear drive unit.

4. The transfer system according to claim 3, wherein the swivel arm is arranged to be telescopable, and the linear drive unit is a telescope drive.

5. The transfer system according to claim 1, wherein the transfer curve comprises two independent moving components having travel paths of different length, the one of the drive units being associated with a shorter of the two paths, and another of the drive units being associated with a longer of the two paths.

6. The transfer system according to claim 1, wherein the lever mechanism is arranged in a vertical plane.

7. A transfer system, for transport and positioning of workpieces, comprising
- a controllable workpiece holding device configured to be set up for temporarily coupling a workpiece to a carrier device,
- a lever mechanism being configured to hold and guide the workpiece holding device on an at least two-dimensional transfer curve, and
- at least two drive units which are connected by the lever mechanism with the workpiece holding device, wherein one of the drive units is arranged in a stationary manner and another of the drive units is arranged in a movable manner as an intermediate member in the lever mechanism, wherein the lever mechanism comprises a swivel arm connected at one end with the workpiece holding device and at two connection points spaced therefrom with driving and guiding devices operatively associated with the drive units.

8. The transfer system according to claim 7, wherein one of the driving and guiding devices comprises a positioning device, and another of the devices of the driving and positioning devices comprises a guide with two degrees of freedom.

9. A transfer system for transport and positioning of workpieces, comprising
- a controllable workpiece holding device configured to be set up for temporarily coupling a workpiece to a carrier device,
- a lever mechanism being configured to hold and guide the workpiece holding device on an at least two-dimensional transfer curve, and
- at least two drive units which are connected by the lever mechanism with the workpiece holding device, wherein one of the drive units is arranged in a stationary manner and another of the drive units is arranged in a movable manner as an intermediate member in the lever mechanism, wherein the one drive unit is a linear drive and the other drive unit is a swivel drive.

10. The transfer system according to claim 9, wherein the linear drive is configured to act upon a linear slide block carrying the swivel arm.

11. The transfer system according to claim 10, wherein the linear slide block is operatively arranged in a vertically displaceable manner.

12. The transfer system according to claim 10, wherein a guide rod is swivellably disposed on the linear slide block and is connected, on an end thereof away from the linear slide block, with the swivel arm.

13. The transfer system according to claim 12, wherein an articulated connection is provided between the swivel arm and the guide rod.

14. The transfer system according to claim 10, wherein another of the drive units is carried by the linear slide block, the guide rod is operatively connected with an output of this drive unit.

15. The transfer system, for transport and positioning of workpieces, comprising
- a controllable workpiece holding device configured to be set up for temporarily coupling a workpiece to a carrier device,
- a lever mechanism being configured to hold and guide the workpiece holding device on an at least two-dimensional transfer curve, and
- at least two drive units which are connected by the lever mechanism with the workpiece holding device, wherein one of the drive units is arranged in a stationary manner and another of the drive units is arranged in a movable manner as an intermediate member in the lever mechanism, and another of the drive units is operatively connected with a swivel arm of the lever mechanism and another of the drive units comprises a swivel drive unit.

16. A transfer system for transport and positioning of workpieces, comprising
- a controllable workpiece holding device configured to be set up for temporarily coupling a workpiece to a carrier device,
- a lever mechanism being configured to hold and guide the workpiece holding device on an at least two-dimensional transfer curve, and
- at least two drive units which are connected by the lever mechanism with the workpiece holding device, wherein one of the drive units is arranged in a stationary manner and another of the drive units is arranged in a movable manner as an intermediate member in the lever mechanism, wherein the lever mechanism has articulation and swivelling axes which are arranged horizontally and transversely to a transport direction.

* * * * *